(12) United States Patent
Saha et al.

(10) Patent No.: US 11,086,610 B2
(45) Date of Patent: Aug. 10, 2021

(54) INSTANCE UPGRADE TECHNIQUES

(71) Applicant: ServiceNow, Inc., Santa Clara, CA (US)

(72) Inventors: Prabodh Saha, Hyderabad (IN); Matthew Kilbride, San Diego, CA (US); Jean-Remy Facq, Kirkland, WA (US); Kevin Pickard, West Point, UT (US); Tirumala Reddy Annem, Hyderabad (IN); Manojkumar Haridas Shende, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/971,715

(22) Filed: May 4, 2018

(65) Prior Publication Data

US 2019/0339959 A1    Nov. 7, 2019

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45575* (2013.01); *G06F 2009/45595* (2013.01)

(58) Field of Classification Search
CPC ..... G06F 8/60; G06F 8/61; G06F 8/62; G06F 8/65; G06F 8/71; G06F 9/45558; G06F 9/485; G06F 9/547; G06F 11/1433; H04L 67/16
USPC ......................................................... 717/168
See application file for complete search history.

(56) References Cited

U.S. PATENT DOCUMENTS

| | | |
|---|---|---|
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |

(Continued)

*Primary Examiner* — Wei Y Zhen
*Assistant Examiner* — Mohammed N Huda
(74) *Attorney, Agent, or Firm* — Fletcher Yoder PC (57) ABSTRACT

Provided are instance upgrade techniques useful for upgrading the software of an instance, such as in a multi-instance architecture. The techniques relate to facilitating efficient upgrades to the software of an instance by pausing workflow automations associated with the instances at non-critical stages before the upgrade begins and resuming the workflow automations after the upgrade is complete. The techniques may also include validation workflows to facilitate the upgrade and restart process.

14 Claims, 5 Drawing Sheets

(56) References Cited

U.S. PATENT DOCUMENTS

| | | |
|---|---|---|
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 2010/0281456 A1* | 11/2010 | Eizenman et al. ........ G06F 8/61 717/104 |
| 2012/0054731 A1* | 3/2012 | Aravamudan et al. ...................... G06F 9/45558 717/170 |
| 2014/0282353 A1* | 9/2014 | Jubran et al. ............. G06F 8/71 717/101 |

\* cited by examiner

INSTANCE UPGRADE TECHNIQUES

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. One approach to providing a high-availability, enterprise-grade cloud experience may be based on a multi-instance type architecture. At the heart of this architecture, each customer application instance is supported by a multi-homed network configuration with multiple connections to the Internet. Production application servers are load balanced within each data center. Production database servers are replicated in near-real time to a peer data center.

With respect to the multi-instance architecture aspect, each instance runs its own application logic and database processes so that a respective customer's instance does not have to be on the same version or upgraded at the same time as other customers' instances. Further, such an architecture provides separate application nodes and database processes for each customer such that there is no co-mingling of customer data in a shared database, as might occur in a multi-tenant architecture. Instances may be deployed on a per-customer basis, allowing the multi-instance cloud to scale horizontally to meet each customer's performance needs.

Software upgrades to instances in a multi-instance architecture may provide additions and enhancements to platform functionality of each instance. These additions and enhancements may include new applications or new features that may improve the operation, the productivity, and the performance of each instance. However, several problems may occur as a result of a software upgrade to an instance. For example, running workflow executions (e.g., workflow automations) performing a mission critical activity in remote instances may fall into an inconsistent or bad state, produce errors, or get aborted during a software upgrade of a central instance. Such issues may encourage an organization to delay installation of an upgrade to their instance software even though such an update is available. Accordingly, improved systems and techniques for upgrading client instances is needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to techniques for upgrading software of an instance, such as in a multi-instance architecture. In particular, the current disclosure relates to facilitating efficient upgrades to client instance software by pausing workflow automations associated with the client instances at non-critical stages before the upgrade begins and resuming the workflow automations from the exact point the workflow automations were paused after the upgrade is complete. In some implementations, validation workflows may also be employed to facilitate the upgrade and restart process.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and organization-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As noted above, various organization may increasingly rely on high-availability, enterprise-grade cloud infrastructure based on a multi-instance type architecture. At the heart of this architecture, each customer application instance is supported by a multi-homed network configuration with multiple connections to the Internet. Production application servers are load balanced within each data center. Production database servers are replicated in near-real time to a peer data center.

In such a multi-instance architecture, each instance runs its own application logic and database processes so that a respective customer's instance does not have to be on the same version or upgraded at the same time as other customers' instances. Further, such an architecture provides separate application nodes and database processes for each customer such that there is no co-mingling of customer data in a shared database, as might occur in a multi-tenant architecture. In this way, multi-instance architecture facilitates hardware and software maintenance on client instances on a client-by-client basis. Additionally, multi-instance architecture allows each client to upgrade an instance at the schedule and needs of each client. However, clients of a service provider may still, for various reasons, delay upgrading the software of their instances to the latest release.

For example, a client of a service provider may have many personnel working to create or improve features on the client's platform. These personnel may each run an individual workflow automation on one or more remote instances of the client's central instance. These workflow automations may involve long running activities, which may coincide with an upgrade release of the client's central instance.

If the client chooses to initiate the software upgrade when these workflow automations are still executing, a strong likelihood exists that many of the running workflow automations may fall into, for example, an inconsistent or bad state, produce errors, or get aborted during the software upgrade. As a result, after the software upgrade of the central instance is completed, a client's personnel will have to either nudge the workflow automations that have fallen into an inconsistent or bad state to completion or clean up anything the aborted workflow automations left behind. This clean-up process often takes hours or days to complete.

By employing the systems and techniques used herein, a party or a client of a service provider may pause any executing or incoming workflow automations of an instance in a non-critical state of the workflow without affecting the automations themselves. In this way, a software upgrade to a client instance may be completed while minimizing the amount of workflow automations that fall into an inconsistent or bad state, produce errors, or become aborted as a result of the software upgrade. This technique will also minimize the amount of post-upgrade time personnel will spend cleaning up aborted workflow automations and/or nudging any bad state workflow automations to completion. After a restart of the client instance, the paused workflow automations may then be resumed while minimizing any adverse effects to the automations themselves.

With the preceding in mind, the following figures relate to various types of generalized system architectures or configurations that may be employed to provide services to a client in a multi-instance framework that in turn might be subject to software upgrades as discussed herein. Correspondingly, these system and platform examples may also relate to systems and platforms on which the techniques discussed herein may be implemented to facilitate instance upgrade.

Figure 1:
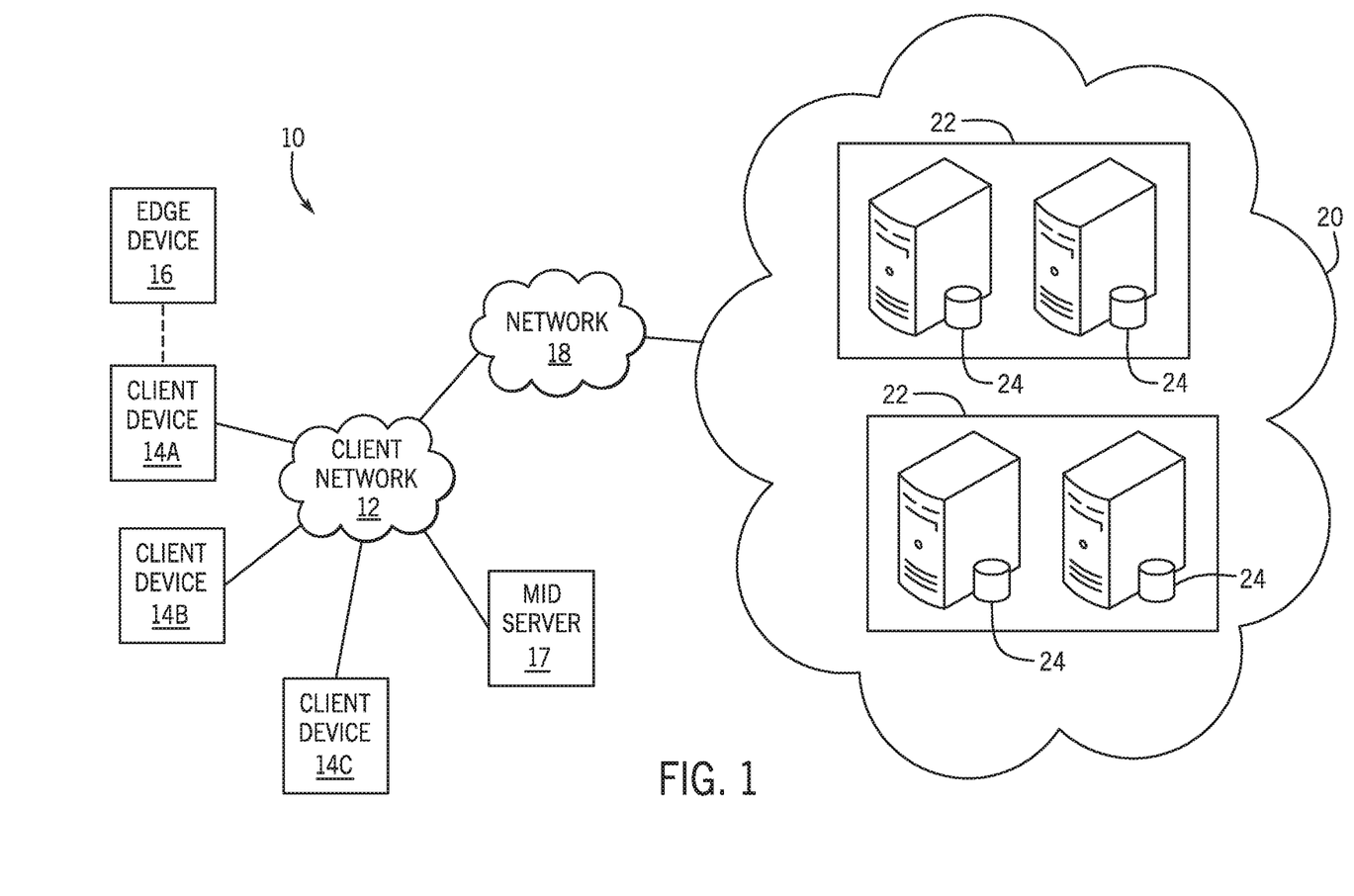
FIG. 1 is a block diagram of an embodiment of a distributed computing system utilizing a platform and a database (DB), in accordance with aspects of the present approach.

Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 includes one or more data centers 22, where each data center could correspond to a different geographic location. Each of the data centers 22 includes a plurality of server instances 24 (also referred to herein as application instances or application server instances), where each server instance can be implemented on a physical computing system, such as a single electronic computing device (e.g., a single physical hardware server) or could be in the form a multi-computing device (e.g., multiple physical hardware servers). Examples of server instances 24 include, but are not limited to a web server instance (e.g., a unitary Apache installation), an application server instance (e.g., unitary Java® Virtual Machine), and/or a database server instance, e.g., a unitary MySQL® catalog (MySQL® is a registered trademark owned by MySQL AB A COMPANY).

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single server instance and/or other combinations of server instances 24, such as one or more dedicated web server instances, one or more dedicated application server instances, and one or more database server instances, for each customer instance. In a multi-instance cloud architecture, multiple customer instances could be installed on a single physical hardware server, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
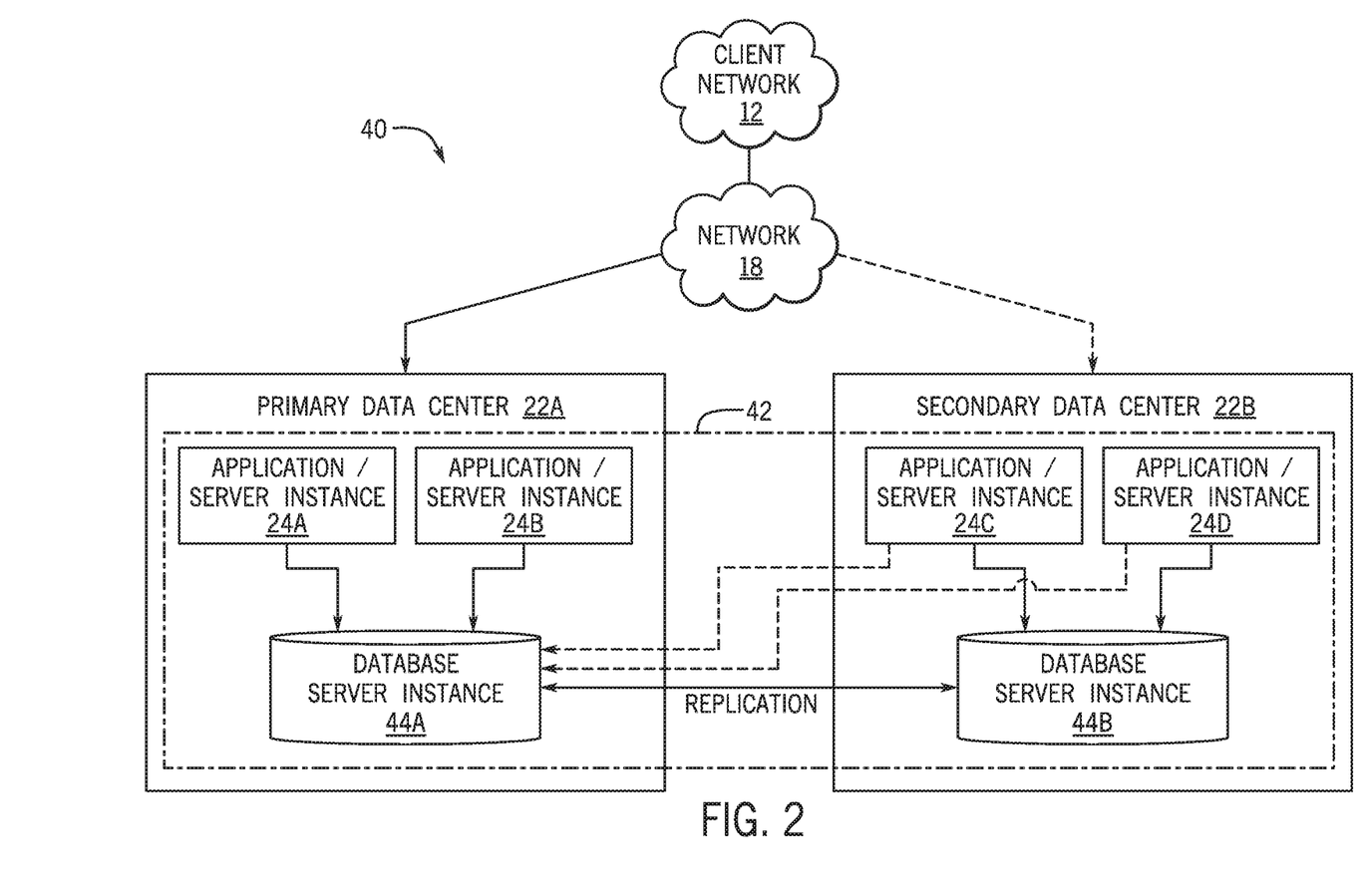
FIG. 2 is a schematic of an embodiment of a multi-instance architecture that may be used in conjunction with a distributed computing system, in accordance with aspects of the present approach.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is comprised of four dedicated application server instances 24A, 24B, 24C, and 24D and two dedicated database server instances 44A and 44B. Stated another way, the application server instances 24A-24D and database server instances 44A and 44B are not shared with other client instances. Other embodiments of the multi-instance cloud architecture 40 could include other types of dedicated server instances, such as a web server instance. For example, the client instance 42 could include the four dedicated application server instances 24A-24D, two dedicated database server instances 44A and 44B, and four dedicated web server instances (not shown in FIG. 2).

To facilitate higher availability of the client instance 42, the application server instances 24A-24D and database server instances 44A and 44B are allocated to two different data centers 22A and 22B, where one of the data centers 22 acts as a backup data center. In reference to FIG. 2, data center 22A acts as a primary data center 22A that includes a primary pair of application server instances 24A and 24B and the primary database server instance 44A for the client instance 42, and data center 22B acts as a secondary data center 22B to back up the primary data center 22A for the client instance 42. To back up the primary data center 22A for the client instance 42, the secondary data center 22 includes a secondary pair of application server instances 24C and 24D and a secondary database server instance 44B. The primary database server instance 44A is able to replicate data to the secondary database server instance 44B.

As shown in FIG. 2, the primary database server instance 44A may replicate data to the secondary database server instance 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the application server instances 24A and 24B and/or primary data server instance 44A fails and/or is under maintenance, data traffic for client instances 42 can be diverted to the secondary application server instances 24C and the secondary database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different server instance into a single server instance. Using FIG. 2 as an example, the application server instances 24A-D and database server instances 44A and 44B may be combined into a single server instance. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
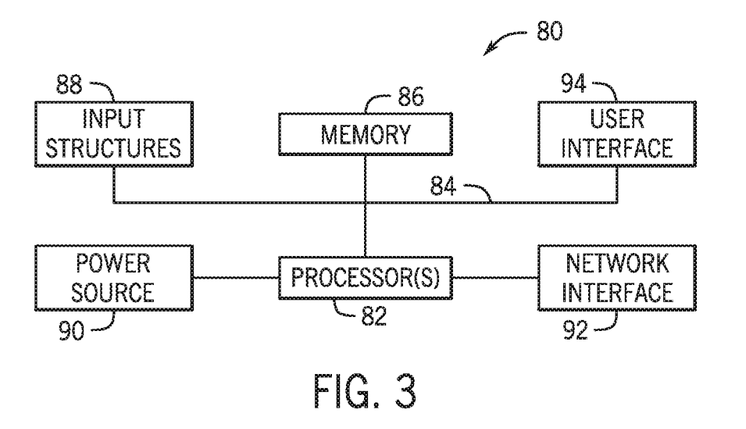
FIG. 3 is a block diagram of an embodiment of a computing device utilized in a distributed computing system, in accordance with aspects of the present approach.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture.

Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
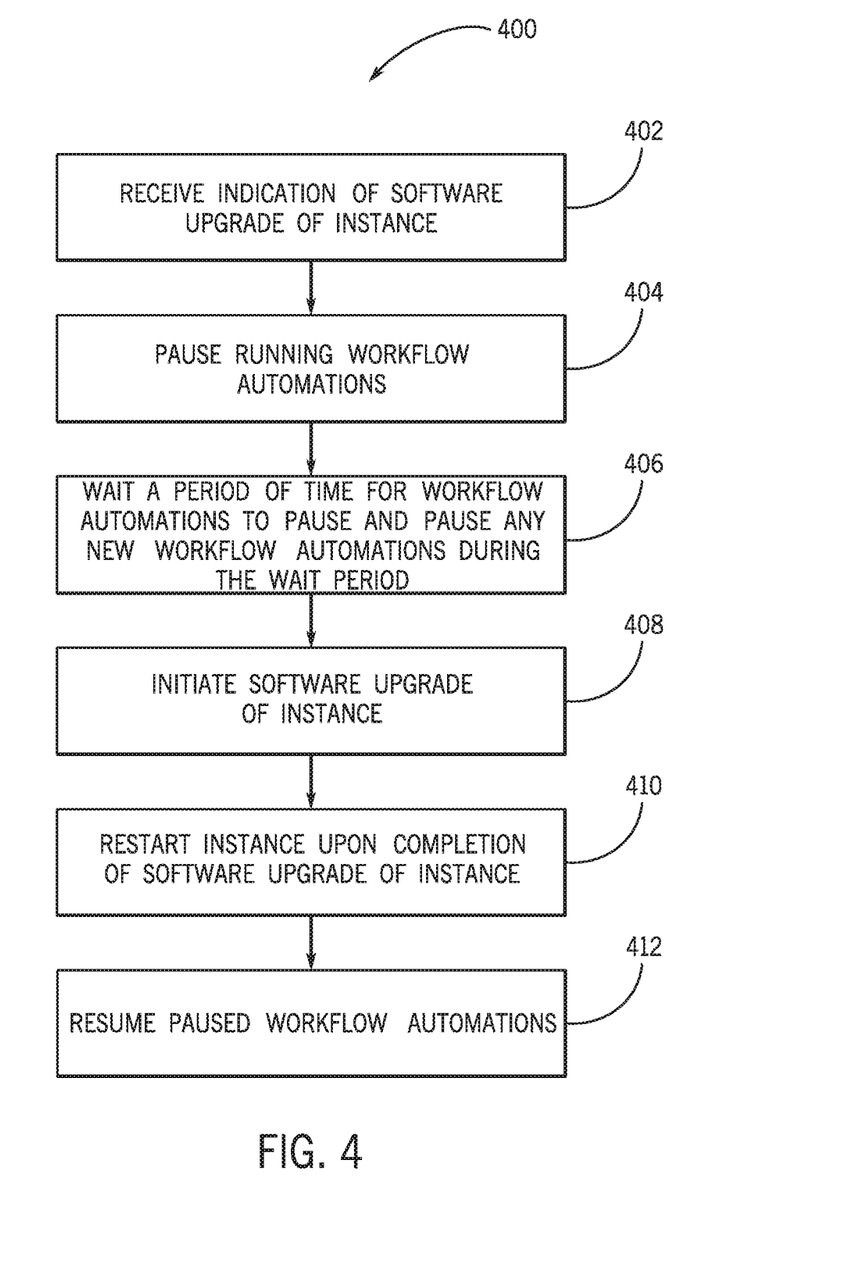
FIG. 4 is a flow diagram of an embodiment of upgrading the software of a client instance, in accordance with aspects of the present approach.

As discussed herein, the devices and architectures described above may constitute platforms or systems on which a party or a client of a service provider may utilize the techniques discussed herein to upgrade the software of one or more instances. With the preceding in mind, FIG. 4 is a flow diagram 400 of a process for upgrading the software of an instance. For example, the instance may include an instance administered by an enterprise management data center. In step 402, one or more processors 202 of computing device 200 may receive an indication of a software upgrade of the instance over communication channels noted herein. In response to the indication or an operator instruction to install the upgrade (such as via one or more interaction points of an interface provided to the user in response to receipt of the upgrade availability indication) one or more workflow automations executing within the instance are paused (step 404). As used herein, an executing workflow automation may be "paused" (e.g., enters a paused state) when the workflow automation enters a transition period between individual sections of its execution, and is not in a critical section of its execution. In some embodiments, one running workflow automation, two running workflow automations, five running workflow automations, fifty running workflow automations, one hundred running workflow automations, or more, may be paused in response to an indication that the upgrade is to be installed.

In step 406, a wait period passes to allow any executing workflow automations and/or any incoming workflow automations to enter a paused state. In some embodiments, the wait period is configurable by the party or the client. For example, the default wait period may be set to five minutes, ten minutes, thirty minutes, one hour, two hours, or more. During this wait period, one or more workflow automations may be placed into a paused state, such as in response to the respective workflow automation entering a transition period, as noted above. In practice, the wait period may be configured based on empirical data or a theoretical prediction as to the length of interval needed for some threshold number or percentage of running workflow automations to be paused prior to initiating the upgrade process. In addition to pausing one or more running workflow automations, any new or upcoming automations entering the system during this wait period will be "paused" before beginning execution. In other words, the new or upcoming automation will be prevented from running any activity associated with the new or upcoming automation. In step 408, the software upgrade of the instance initiates after the wait period lapses. In some embodiments, other software upgrades associated with the instance environment are also initiated. For example, a software upgrade of a management, instrumentation, and discovery (MID) server may also initiate. In step 410, after the upgrade is complete, the instance is restarted. In step 412, any paused workflow automations may resume. In some embodiments, the paused workflow automations may automatically be resumed after the instance is restarted. In some embodiments, the paused workflow automations may be resumed in response to user interaction with one or more interaction points provided in an interface to the user via the instance. The paused workflow automations may be resumed individually or as a group through the one or more interaction points via the instance.

Figure 5:
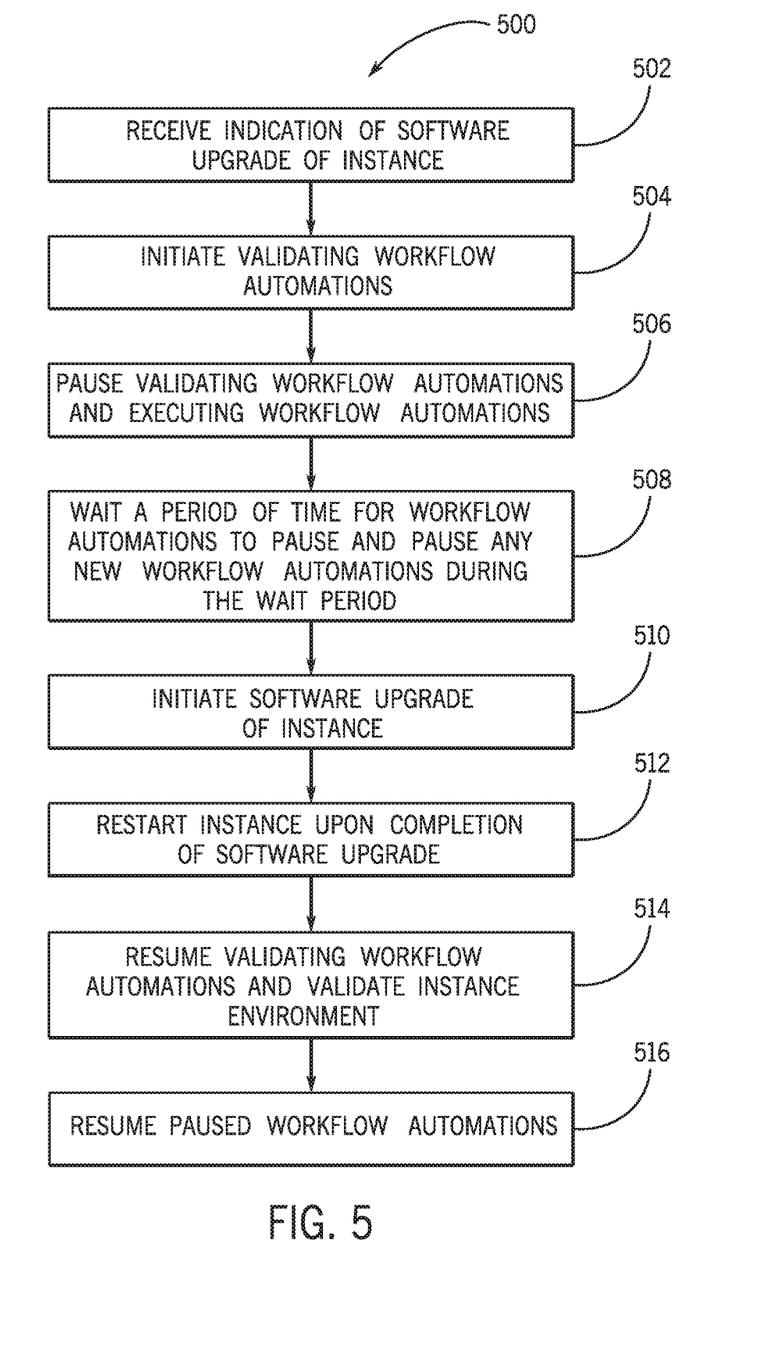
FIG. 5 is a flow diagram of an embodiment of upgrading the software of a client instance, in accordance with aspects of the present approach.

In some embodiments, it may be desirable to validate the instance environment before resuming the paused automation workflows. FIG. 5 is a flow diagram 500 of a process for upgrading the software of an instance with such validation. In step 502 (i.e., as described above with regard to step 402), one or more processors 202 of computing device 200 may receive an indication of a software upgrade of the instance over communication channels noted herein. In response to the indication or an operator instruction to install the upgrade (such as via one or more interaction points of an interface provided to the user in response to receipt of the upgrade availability indication) one or more validating workflow automations begin executing. In some embodiments, the validating workflow automations may begin executing in response to instructions or commands received via one or more interaction points displayed in a user interface via the instance. The validating workflow automations may initiate individually or as a group.

In step 506, one or more workflow automations (including the one or more validating workflow automations) executing within the instance are paused. In step 508, a wait period passes to allow any executing workflow automations (including the one or more validating workflow automations) to enter a paused state. Additionally, any newly launched or upcoming workflow automations are automatically "paused" during the wait period before the newly launched or upcoming workflow automations can begin execution. As described above, the wait period may be configurable by the party or the client and may be based on having some threshold value of the workflow automation in a paused state. In step 510, the software upgrade of the instance initiates after the wait period lapses. In some embodiments, other software upgrades associated with the instance environment are also initiated. In step 512, the instance is restarted after the software upgrade of the instance is complete. In step 514, the paused validating workflow automation(s) are resumed and the instance environment is validated by determining that the validating workflow automation(s) have resumed successfully. In some embodiments, the paused validating workflow automations may be resumed in response to user interaction with one or more interaction points provided in an interface to the user via the instance. In step 516, any paused workflow automations (e.g., the paused executing and/or incoming workflow automations) are resumed. In some embodiments, the paused workflow automations may automatically resume after the instance environment is validated. In some embodiments, the paused workflow automations may resume in response to instructions or commands received via one or more interaction points displayed in a user interface via the instance. The paused workflow automations may resume individually or as a group.

Although the techniques described herein relate to a software upgrade of an instance, it should be understood that some embodiments may involve the deployment of new software or a new subsystem, an upgrade or the patching of key ancillary components of a distributed system (e.g., MIDs), the patching of running software components, a restart of running software components, or the deployment of a software release in which a bug has been fixed. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples, including the best mode, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
an enterprise management data center;
a client instance hosted by the enterprise management data center, wherein the client instance is hosted for one or more client networks, and wherein the enterprise management data center comprises a processor and a memory including instructions that, when executed by the processor, cause the processor to perform operations comprising:
receiving an indication of a software upgrade to the client instance;
initiating one or more validating automations in response to receiving the indication of the software upgrade;
pausing one or more workflow automations currently executing within the client instance and the one or more validating automations during a time period and pausing any new workflow automations that have begun executing during the time period, wherein the one or more workflow automations began executing before receiving the indication of the software upgrade to the client instance;
initiating the software upgrade to the client instance after expiration of the time period; and
after completion of the software upgrade to the client instance:
restarting the client instance;
resuming the one or more validating automations;
determining that the one or more validating automations have been resumed without error; and
resuming the one or more workflow automations after determining that the one or more validating automations have been resumed without error.

2. The system of claim 1, wherein pausing the one or more workflow automations comprises pausing the one or more workflow automations based on an execution state of each workflow automation of the one or more workflow automations.

3. The system of claim 2, wherein the execution state comprises a non-critical, transitional state.

4. The system of claim 1, wherein a duration of the time period is based on a theoretical prediction of a time interval for pausing a threshold number of the one or more workflow automations or a percentage of the one or more workflow automations.

5. The system of claim 1, wherein a duration of the time period is based on empirical data of a time interval for pausing a threshold number of the one or more workflow automations or a percentage of the one or more workflow automations.

6. The system of claim 1, wherein a duration of the time period is based on a predetermined period.

7. The system of claim 1, wherein pausing the one or more workflow automations comprise pausing the one or more workflow automations after the one or more workflow automations have entered a non-critical transition period between individual sections of execution of the one or more workflow automations.

8. The system of claim 1, wherein the instructions cause the processor to prevent one or more additional workflow automations from executing during the software upgrade to the client instance.

9. A method, comprising:
receiving an indication of a software upgrade to a client instance;

initiating one or more validating automations in response to receiving the indication of the software upgrade;

pausing one or more workflow automations currently executing within the client instance and the one or more validating automations during a time period and pausing any new workflow automations that have begun executing during the time period, wherein the one or more workflow automations began executing before receiving the indication of the software upgrade to the client instance;

initiating the software upgrade to the client instance after expiration of the time period; and after completion of the software upgrade to the client instance:
  restarting the client instance;
  resuming the one or more validating automations;
  determining that the one or more validating automations have been resumed without error; and
  resuming the one or more workflow automations after determining that the one or more validating automations have been resumed without error.

10. The method of claim 9, wherein pausing the one or more workflow automations comprises pausing the one or more workflow automations based on an execution state of each workflow automation of the one or more workflow automations.

11. The method of claim 10, wherein the execution state comprises a non-critical, transitional state.

12. The method of claim 9, wherein resuming the one or more workflow automations comprises individually resuming each workflow automation of the one or more workflow automations.

13. The method of claim 9, wherein resuming the one or more workflow automations comprises resuming two or more workflow automations as a group.

14. A tangible, non-transitory, machine-readable medium, comprising instructions that, when executed by one or more processors, cause the one or more processors to:
  receive an indication of a software upgrade to a client instance;
  initiate one or more validating automations in response to receiving the indication of the software upgrade;
  pause one or more workflow automations currently executing within the client instance and the one or more validating automations during a time period and pause any new workflow automations that have begun executing during the time period, wherein the one or more workflow automations began executing before receiving the indication of the software upgrade to the client instance;
  initiate the software upgrade to the client instance after expiration of the time period; and
  after completion of the software upgrade to the client instance:
    restart the client instance;
    resume the one or more validating automations;
    determine that the one or more validating automations have been resumed without error; and
    resume the one or more workflow automations after determining that the one or more validating automations have been resumed without error.

* * * * *